April 4, 1961 L. C. SWAIN 2,977,679
PRUNING SAW
Filed March 13, 1958
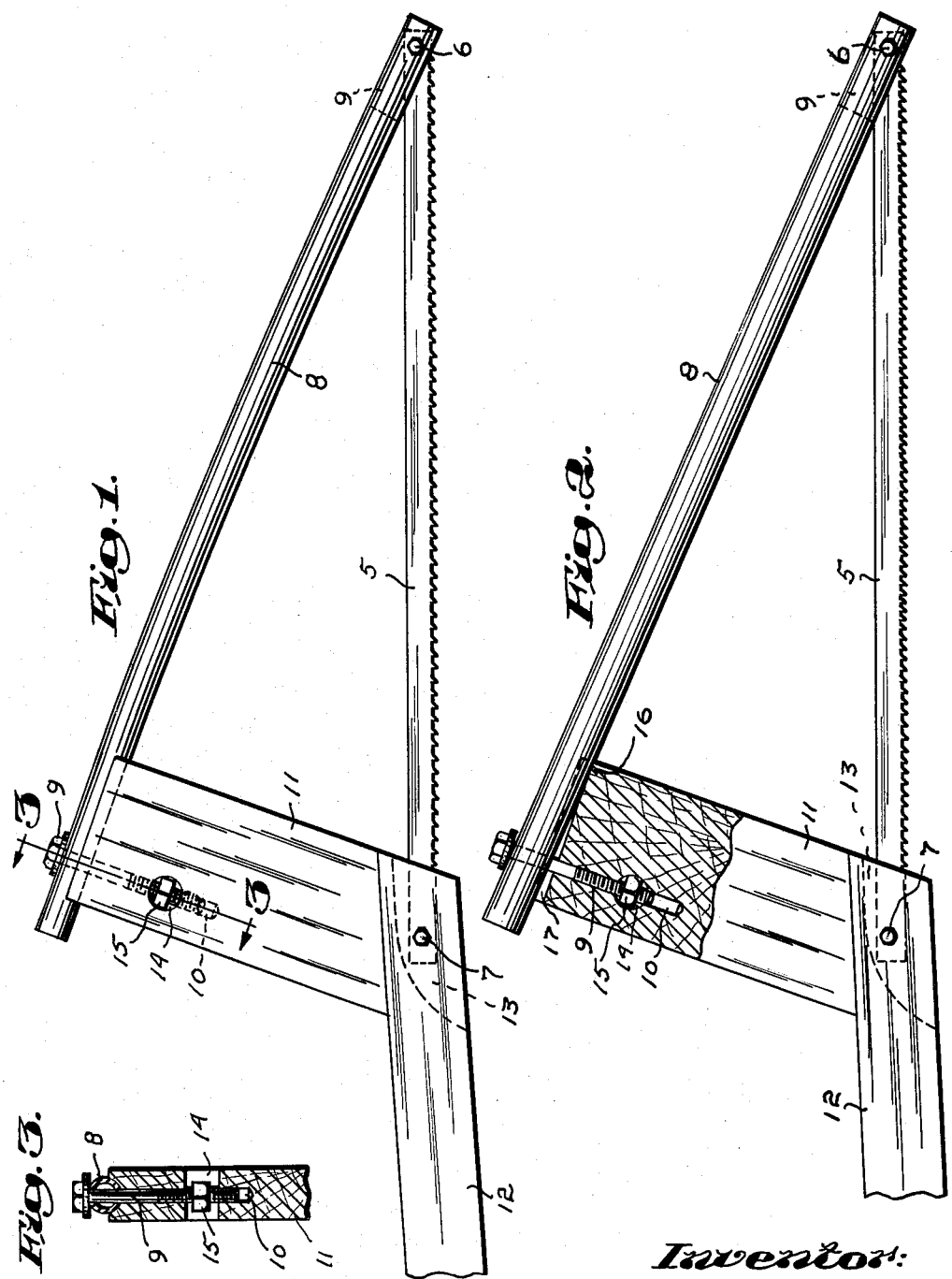
Inventor:
Lewis C. Swain,
by [signature]
Attorney

United States Patent Office 2,977,679
Patented Apr. 4, 1961

2,977,679
PRUNING SAW
Lewis C. Swain, Lincoln St., Exeter, N.H.
Filed Mar. 13, 1958, Ser. No. 721,292
3 Claims. (Cl. 30—166)

The present invention relates to saws of the pruning saw type and particularly to the frames thereof.

Pruning saws, especially those for use in trimming up brush and thinning out forest growth, must be adapted to function properly in spite of hard usage. Those that are most satisfactory in use are adaptations of the type in which the frame is a metal bow to whose extremities the ends of the blade are detachably caught. While some of these require that the frame be tensioned to enable the blade to be attached or detached therefrom, the saws that are most satisfactory in use have tensioning means.

The present invention has as its principal objective the provision of saws whose frames have means enabling the blade to be suitably tensioned and untensioned that are simple, easily adjusted, and efficient in operation. This objective is attained by providing first and second frame members with one end of each of them connected to a respective one of the blade ends. One of the members is resilient and the other end of one of the members has a fulcrum underlying a part of the other member to which part it is joined by a threaded connection arranged and disposed to tension the blade by tensioning the resilient frame member.

In the accompanying drawings, there is shown an illustrative embodiment of the invention from which these and other of its objectives, novel features, and advantages will be readily apparent.

In the drawings:

Fig. 1 is a side elevation of a saw in accordance with the invention,

Fig. 2 is a similar view of the saw but with the blade untensioned and one of the frame members partly sectioned, and Fig. 3 is a fragmentary section taken approximately along the indicated lines 3—3 of Fig. 1.

The saw blade 5 is conventional and has holes at each end for pins 6 and 7. This type of blade is well adapted to meet all requirements provided, of course, that it is kept sharp and properly tensioned during use.

The frame, illustrated by the drawings, has a first frame member 8 in the form of resilient, tubular stock shown as slightly longer than the blade 5. At one end, the member 8 has a slot 8a to accommodate one end of the blade 5 and has a transverse opening through which the pin 6 extends as a pivot for that end of the blade.

Adjacent its other end, the frame member 8 has a transversely aligned pair of holes, disposed at right angles to the holes for the pin 6, for the bolt 9 extending into a bore 10 in the second frame member 11.

The second frame member 11 is shown as a rigid cross piece provided with a handle portion 12, a slot 13 for the other end of the blade 5, and transversely aligned holes for the pin 7. An opening 14 intersects the bore 10 and accommodates the nut 15 through which the bolt 9 is threaded.

It will be noted that the end of the second frame member 11 through which the bore 10 opens is so shaped and disposed that, at least when the frame member 8 is not tensioned, a fulcrum 16 (see Fig. 2), is provided underlying the portion of the frame member 8 through which the bolt 9 extends.

With this arrangement, the threaded connection between the frame member established by the bolt 9 and the nut 15, may be adjusted to draw the proximate portion of the member 8 towards the underlying end of the member 11. When the member 8 is of tubular stock, the fulcrum providing end of the member 11 is formed to establish a channeled seat 17.

It will thus be apparent that the pruning saws in accordance with the invention are adapted to be economically produced and the ease with which the tension of the blade may be adjusted ensures efficient operation.

What I therefore claim and desire to secure by Letters Patent is:

1. In a saw of the pruning saw type, a first frame member including a fulcrum at one end, a second frame member of resilient stock, a blade, pivot means connecting one end of the blade to said other end of said first frame member and to one end of said second frame member, said first frame member also including, at said other end, a handle disposed in alinement with said blade, said second frame member engaging said fulcrum with its other end extending beyond it, and a threaded connection between said first frame member and said other end of said second frame member at a point rearwardly of said fulcrum, said connection including an adjustable member anchored between the ends of said first frame member.

2. In a saw of the pruning saw type, a first frame member including a fulcrum at one end, a handle portion secured to and extending rearwardly of the other end thereof and having a slot, a second frame member of resilient stock, a blade, pivot means connecting one end of said blade in said slot to said handle portion and to one end of said second frame member, said second frame member engaging said fulcrum with its other end extending beyond it, and a threaded connection between said first frame member and said other end of said second frame member at a point rearwardly of said fulcrum, said connection including an anchor between the ends of said first frame member.

3. In a saw of the pruning saw type, a first frame member having a channel extending lengthwise of one end, a bore opening upwardly in the rear part of said channel, and a transverse bore intersecting said first named bore and a handle portion extending rearwardly of the other end thereof, a second frame member of tubular, resilient stock, a blade, pivot means connecting one end of said blade to said other end of said first frame member and to one end of said second frame member, the other end of said second frame member being entrant of said channel and having a transverse bore in registry with said upwardly opening bore, a bolt extending through the registering bores of said members, and a nut threaded on said bolt and exposed in said intersecting bore, said channel being downwardly and rearwardly inclined relative to said other end of said second frame member so that a front part of said channel constitutes a fulcrum therefor.

References Cited in the file of this patent
UNITED STATES PATENTS

| | | |
|---|---|---|
| 257,802 | Woodrough | May 9, 1882 |
| 330,104 | Fornander | Nov. 10, 1885 |
| 437,764 | Addison | Oct. 7, 1890 |
| 491,980 | Brewer | Feb. 21, 1893 |
| 579,492 | Morrell | Mar. 23, 1897 |
| 1,424,378 | Remington | Aug. 1, 1922 |
| 1,471,214 | Sieben | Oct. 16, 1923 |
| 1,497,135 | Cunneen | June 10, 1924 |
| 2,399,541 | Clark | Apr. 30, 1946 |
| 2,645,261 | Swanstrom | July 14, 1953 |